United States Patent
Jin et al.

(10) Patent No.: US 7,835,340 B2
(45) Date of Patent: Nov. 16, 2010

(54) METHOD OF SUPPORTING MULTIPLE CODES IN A WIRELESS MOBILE COMMUNICATION SYSTEM

(75) Inventors: Yong Suk Jin, Anyang-si (KR); Chang Jae Lee, Cheonan-si (KR); Bin Chul Ihm, Anyang-si (KR); Ki Seon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 770 days.

(21) Appl. No.: 11/375,718

(22) Filed: Mar. 14, 2006

(65) Prior Publication Data

US 2006/0227778 A1 Oct. 12, 2006

(30) Foreign Application Priority Data

Apr. 9, 2005 (KR) ............... 10-2005-0029751
Apr. 25, 2005 (KR) ............... 10-2005-0034190

(51) Int. Cl.
*H04B 7/212* (2006.01)
*G10L 19/00* (2006.01)
*H04B 7/216* (2006.01)

(52) U.S. Cl. ............ 370/348; 370/443; 704/500
(58) Field of Classification Search ......... 370/389, 370/208, 328, 349, 350; 455/450, 517, 522, 455/458
See application file for complete search history.

(56) References Cited

U.S. PATENT DOCUMENTS

| | | | |
|---|---|---|---|
| 6,778,558 B2* | 8/2004 | Balachandran et al. | 370/470 |
| 7,359,332 B2* | 4/2008 | Kolze et al. | 370/252 |
| 2005/0159162 A1* | 7/2005 | Park | 455/450 |
| 2005/0159163 A1* | 7/2005 | Chang et al. | 455/450 |
| 2005/0289437 A1* | 12/2005 | Oh et al. | 714/758 |
| 2006/0133259 A1* | 6/2006 | Lin et al. | 370/208 |

OTHER PUBLICATIONS

Joel Demarty, Operational Margins for DL Link Adaptation, IEEE C802.16maint-05/025r1, p. 0-2.*
Air Interface for Fixec Broadband Wireless Access Systems—IEEE Standard 802.16—(2004).*
Wu, J. et al. "Decrease DCD/UCD Message Overhead", IEEE 802.16 Broadband Wireless Access Working Group, IEEE CB02.16maint-05/005, [online], Jan. 12, 2005 [retrieved on Apr. 2, 2007]. Retrieved from the Internet: <URL:http://www.ieee802.org/16/maint/contrib/C80216maint-05_005.pdf>. pp. 1-7.
Ihm, B.C. et al. "DIUC/UIUC Provision for Supporting Multiple Advanced FEC Types", IEEE 802.16 Broadband Wireless Access Working Group, IEEE C802.16e-05/234r0, [online], April 27, 2005 [retrieved on April 2, 2007]. Retrieved from the Internet: <URL:http://www.ieee802.org/16/tge/contrib/C80216e-05_234r0.pdf>. pp. 1-4.
Yanover, V. "OFDM MAC-PHY Interface", IEEE 802.16 Broadband Wireless Access Working Group, Sep. 3, 2001.
Eklund, C, et al. IEEE Standard 802.16: A Technical Overview of the WirelessMAN Air Interface for Broadband Wireless Access. IEEE Communications Magazine, Jun. 2002.

* cited by examiner

*Primary Examiner*—Daniel J Ryman
*Assistant Examiner*—Christopher Crutchfield
(74) *Attorney, Agent, or Firm*—Lee, Hong, Degerman, Kang & Waimey

(57) ABSTRACT

A method of supporting multiple code types in a wireless mobile communication system is disclosed. More specifically, a mobile station (MS) receives a channel descriptor from a base station (BS), wherein the channel descriptor includes at least one burst profile which includes a code type and an interval usage code. Thereafter, the MS, first, recognizes the code type which includes information on coding scheme to be used by the BS or the MS, and recognizes, second, an interval usage code which is used for classifying all data bursts.

10 Claims, 5 Drawing Sheets

METHOD OF SUPPORTING MULTIPLE CODES IN A WIRELESS MOBILE COMMUNICATION SYSTEM

This application claims the benefit of Korean Applications No. P10-2005-0034190, filed on Apr. 25, 2005 and No. P10-2005-0029751 filed on Apr. 09, 2005, which is hereby incorporated by reference.

BACKGROUND OF THE INVENTION

1. Field of the Invention

The present invention relates to a method of supporting code types, and more particularly, to a method of supporting multiple code types in a wireless mobile communication system.

2. Discussion of the Related Art

In a broadband wireless access system, an Orthogonal Frequency Division Multiple Access (OFDMA) scheme is used to transmit data. When the OFDMA scheme is used, a structure of a frame is defined as follows. First, a downlink frame represents a preamble at the beginning of the frame which can be used for time synchronization between a mobile station (MS) and a base station (BS), and at the same time, for channel equalization in a physical layer. Following the preamble, the frame includes a Downlink Map (DL-MAP) message and an Uplink Map (UL-MAP) message which define location and usage of allocated bursts.

More specifically, the DL-MAP message defines the usage of each burst allocated in the downlink section of the frame. Similarly, the UL-MAP message defines the usage of the burst allocated in the uplink section of the frame. An Information Element (IE), which is included in the DL-MAP, is classified in a downlink traffic section of a user group according to a Downlink Interval Usage Code (DIUC), a Connection Identification (CID), and the location of the burst signal (e.g., sub-channel offset, symbol offset, number of sub-channels and number of symbols).

The use of the IE of the UL-MAP is determined by an Uplink Interval Usage Code (UIUC) per each CID. Moreover, a corresponding location of an uplink traffic section is defined by duration. Here, the usage of each section is determined according to the values of the UIUC used by the UL-MAP. A starting point of each section is offset by an amount of the duration set in the UL-MAP IE from the previous IE starting point.

The MS receives a Downlink Channel Descriptor (DCD) message and an Uplink Channel Descriptor (UCD) message for network entry or to re-enter the network for handover or for other reasons. A cell periodically provides the physical channel characteristics of the downlink and uplink via the DCD/UCD message. Here, the cell can also be used to represent a base station (BS).

The BS configures the Downlink_Burst_Profile based on the received signal qualities of each MS. In other words, the BS uses a Channel Quality Information (CQI) transmitted from each MS and configures the Downlink_Burst_Profile or an Adoptive Modulation and Coding (AMC) according to the channel status of each MS. Alternatively, as a supportive measure, the Downlink_Burst_Profile can be modified or changed by using a Downlink Burst Profile Change (DBPC) request or response, i.e., DBPC-REQIRSP and a ranging request/response (RNG-REQ/RSP) procedures.

FIG. 1 is an example illustrating a threshold value for modifying the burst profile. The MS measures a Signal to Noise Ratio (SINR), for example, C/(N+1), and compares an average value of allowed application scope. The application scope is limited by a threshold level. That is, if the SINR exceeds the allowed application scope, the MS uses a DBPC scheme to request for a new burst profile. Based on whether the MS requests for a more robust profile having stronger interference (e.g., Quadrature Phase Shift Keying) or whether the MS requests for a less robust profile, having less interference (e.g., 64 Quadrature Amplitude Modulation), the BS executes transmission and reception of the message for actual change of the modulation scheme. Here, the term 'more robust' means that there is stronger interference, and the term 'less robust' means that there is less interference.

According to conventional art, if there is a plurality of code types which can be supported by MS within the scope of services available by the BS, and if downlink/uplink burst profiles are used to support various code types, the intervals (or space) of the SNR corresponding to each AMC increases. Therefore, a modulation scheme that can be provided for one coding type decreases. As a result, the intervals of the threshold values, used for changing the AMC per each coding type, increase, and consequently, there is a problem in properly applying the AMC according to the channel status.

SUMMARY OF THE INVENTION

Accordingly, the present invention is directed to a method of supporting multiple code types in a wireless mobile communication system that substantially obviates one or more problems due to limitations and disadvantages of the related art.

An object of the present invention is to provide a method of supporting multiple code types in a wireless mobile communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, [a method of supporting multiple code types in a wireless mobile communication system includes a mobile station (MS) which receives a channel descriptor from a base station (BS), wherein the channel descriptor includes at least one burst profile which includes a code type and an interval usage code. Thereafter, the MS, first, recognizes the code type which includes information on coding scheme to be used by the BS or the MS, and recognizes, second, an interval usage code which is used for classifying all data bursts.

In another aspect of the present invention, the MS receives a downlink channel descriptor (DCD) from a base station (BS), wherein the DCD includes at least one burst profile. After the receipt, the MS recognizes a code type which includes information on coding scheme to be used by the BS and an interval usage code which is used for classifying all data bursts.

Yet, in another aspect of the present invention, the MS receives an uplink channel descriptor (UCD) from a mobile station (MS), wherein the UCD includes at least one burst profile. After the receipt, the MS recognizes a code type which includes information on coding scheme to be used by the BS and an interval usage code which is used for classifying all data bursts.

In further aspect of the present invention, the MS receives a channel descriptor from a base station (BS), wherein the channel descriptor includes at least one burst profile set which includes a plurality of burst profiles which further includes an interval usage code and at least one code type. Thereafter, the MS recognizes, first, the at least one code type which includes information on coding schemes to be used by the BS or the MS, and recognizes, second, an interval usage code which is used for classifying all data bursts.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
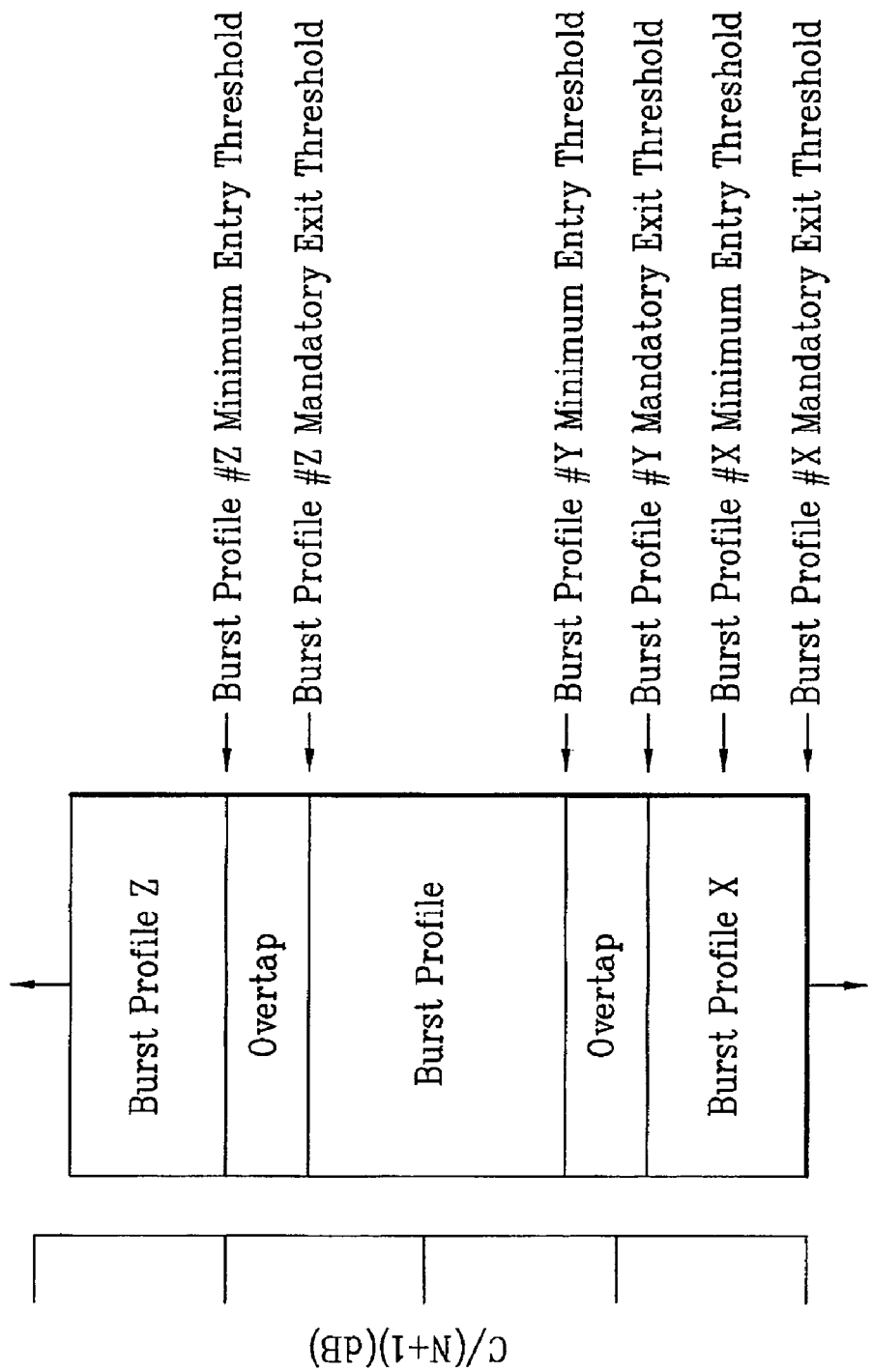
FIG. 1 is an example illustrating a threshold value for modifying the burst profile.

Reference will now be made in detail to the preferred embodiments of the present invention, examples of which are illustrated in the accompanying drawings. Wherever possible, the same reference numbers will be used throughout the drawings to refer to the same or like parts.

Table 1 is an example of the DCD message.

TABLE 1

| Syntax | Size | Notes |
| --- | --- | --- |
| DCD_Message_Format( ) { | | |
| Management Message Type = 1 | 8 bits | |
| Downlink channel ID | 8 bits | |
| Configuration Change Count | 8 bits | |
| TLV Encoded information for the overall channel | variable | TLV specific |
| Begin PHY Specific Section { | | See applicable PHY section. |
| for(i= 1; i <= n; i++) { | | For each Downlink burst profile 1 to n. |
| Downlink_Burst_Profile | variable | PHY specific |
| } | | |
| } | | |
| } | | |

Table 2 is an example of the UCD message.

TABLE 2

| Syntax | Size | Notes |
| --- | --- | --- |
| UCD_Message_Format( ) { | | |
| Management Message Type = 0 | 8 bits | |
| Configuration Change Count | 8 bits | |
| Ranging Backoff Start | 8 bits | |
| Ranging Backoff End | 8 bits | |
| Request Backoff Start | 8 bits | |
| Request Backoff End | 8 bits | |
| TLV Encoded information for the overall channel | variable | TLV specific |
| Begin PHY Specific Section { | | See applicable PHY section. |
| for(i= 1; i <= n; i++) { | | For each uplink burst profile 1 to n. |
| Uplink_Burst_Profile | variable | PHY specific |
| } | | |
| } | | |
| } | | |

The DCD/UCD messages each include physical layer parameters for uplink and downlink allocated burst interval. As examples of the physical layer parameters, there are a modulation type and Forward Error Correction (FEC) code types. In addition, parameters for the FEC code types can be represented by, for example, K and R values of a Reed-Solomon (RS) code.

The parameters are mapped to the DIUC included in a Downlink_Burst_Profile of the DCD message and the UIUC included in an Uplink_Burst_Profile of the UCD message. That is, the Downlink_Burst_Profile information, which is included in the DCD message, can use the DIUC to define certain characteristics of the physical layer used in a specific downlink burst.

Table 3 is an example of a Downlink_Burst_Profile TLV format.

TABLE 3

| Syntax | Size | Notes |
| --- | --- | --- |
| Downlink_Burst_Profile{ | | |
| Type=1 | 8 bits | |
| Length | 8 bits | |
| Reserved | 4 bits | Shall be set zero |
| DIUC | 4 bits | |
| TLV encoded information | Variable | |
| } | | |

As illustrated in Table 3, the downlink burst profile includes a DIUC having a length of 4 bits. Since the DIUC has a 4-bit length, 16 different information (e.g., coding and modulation schemes) can be represented. Moreover, the BS or the cell can select and allocate 13 burst profiles onto DIUC0-DIUC12, and the FEC type can be mapped to each DIUC. Thereafter, the BS announces the selected burst profiles through the DCD/UCD messages.

Alternatively, the uplink burst profile included in the UCD message can use the UIUC to define certain characteristics of the physical layer used in a specific uplink burst.

Table 4 is an example of an Uplink_Burst_Profile TLV format.

TABLE 4

| Syntax | Size | Notes |
| --- | --- | --- |
| Uplink_Burst_Profile{ | | |
| Type=1 | 8 bits | |

TABLE 4-continued

| Syntax | Size | Notes |
|---|---|---|
| Length | 8 bits | |
| Reserved | 4 bits | Shall be set to zero |
| UIUC | 4 bits | |
| TLV encoded information | variable | |
| } | | |

As illustrated in Table 4, the uplink burst profile includes an UIUC having a length of 4 bits. Since the UIUC has a 4-bit length, 16 different information (e.g., coding and modulation schemes) can be represented. Moreover, the BS or the cell can select and allocate 10 burst profiles onto UIUC0–UIUC10, and the FEC type can be mapped to each UIUC. Thereafter, the BS announces the selected burst profiles through the DCD/UCD messages.

Tables 5 and 6 are examples of downlink burst profiles in Type, Length, Value (TLV) format.

TABLE 5

| Name | Type (1 byte) | Length | Value (variable length) |
|---|---|---|---|
| FEC Code type | 150 | 1 | 0 = QPSK (CC) 1/2<br>1 = QPSK (CC) 3/4<br>2 = 16-QAM (CC) 1/2<br>3 = 16-QAM (CC) 3/4<br>4 = 64-QAM (CC) 2/3<br>5 = 64-QAM (CC) 3/4<br>6 = QPSK (BTC) 1/2<br>7 = QPSK (BTC) 3/4 or 2/3<br>8 = 16-QAM (BTC) 3/5<br>9 = 16-QAM (BTC) 4/5<br>10 = 64-QAM (BTC) 2/3 or 5/8<br>11 = 64-QAM (BTC) 5/6 or 4/5<br>12 = QPSK (CTC) 1/2<br>13 = QPSK (CTC) 2/3<br>14 = QPSK (CTC) 3/4<br>15 = 16-QAM (CTC) 1/2<br>16 = 16-QAM (CTC) 3/4<br>17 = 64-QAM (CTC) 2/3<br>18 = 64-QAM (CTC) 3/4<br>19 = 64-QAM (CTC) 5/6<br>20 = QPSK (ZT CC) 1/2<br>21 = QPSK (ZT CC) 3/4<br>22 = 16-QAM (ZT CC) 1/2<br>23 = 16-QAM (ZT CC) 3/4<br>24 = 64-QAM (ZT CC) 2/3<br>25 = 64-QAM (ZT CC) 3/4<br>26..255-Reserved<br>26 = QPSK (LDPC) 1/2<br>27 = QPSK (LDPC) 2/3 A code<br>28 = QPSK (LDPC) 3/4 A code<br>29 = 16-QAM (LDPC) 1/2<br>30 = 16-QAM (LDPC) 2/3 A code<br>31 = 16-QAM (LDPC) 3/4 A code<br>32 = 64-QAM (LDPC) 1/2<br>33 = 64-QAM (LDPC) 2/3 A code<br>34 = 64-QAM (LDPC) 3/4 A code<br>35 = QPSK (LDPC) 2/3 B code<br>36 = QPSK (LDPC) 3/4 B code<br>37 = 16-QAM (LDPC) 2/3 B code<br>38 = 16-QAM (LDPC) 3/4 B code<br>39 = 64-QAM (LDPC) 2/3 B code<br>40 = 64-QAM (LDPC) 3/4 B code<br>41 . . . 255 = Reserved |

TABLE 6

| | | | |
|---|---|---|---|
| DIUC Mandatory exit threshold | 151 | 1 | 0–63.75 dB<br>CINR at or below where this DIUC can no longer be used and where this change to a more robust DIUC is required, in 0.25 dB units. See FIG. 81. |
| DIUC Minimum entry threshold | 152 | 1 | 0–63.75 dB<br>The minimum CINR required to start using this DIUC when changing from a more robust DIUC is required, in 0.25 dB units. See FIG. 81. |

Table 7 is an example of uplink burst profiles in Type, Length, Value (TLV) format.

TABLE 7

| Name | Type | Length | Value |
|---|---|---|---|
| FEC Code type and modulation type | 150 | 1 | 0 = QPSK (CC) 1/2<br>1 = QPSK (CC) 3/4<br>2 = 16-QAM (CC) 1/2<br>3 = 16-QAM (CC) 3/4<br>4 = 64-QAM (CC) 2/3<br>5 = 64-QAM (CC) 3/4<br>6 = QPSK (BTC) 1/2<br>7 = QPSK (BTC) 2/3<br>8 = 16-QAM (BTC) 3/5<br>9 = 16-QAM (BTC) 4/5<br>10 = 64-QAM (BTC) 5/8<br>11 = 64-QAM (BTC) 4/5<br>12 = QPSK (CTC) 1/2<br>13 = QPSK (CTC) 2/3<br>14 = QPSK (CTC) 3/4<br>15 = 16-QAM (CTC) 1/2<br>16 = 16-QAM (CTC) 3/4<br>17 = 64-QAM (CTC) 2/3<br>18 = 64-QAM (CTC) 3/4<br>19 = 64-QAM (CTC) 5/6<br>20 = QPSK (ZT CC) 1/2<br>21 = QPSK (ZT CC) 3/4<br>22 = 16-QAM (ZT CC) 1/2<br>23 = 16-QAM (ZT CC) 3/4<br>24 = 64-QAM (ZT CC) 2/3<br>25 = 64-QAM (ZT CC) 3/4<br>26..255-Reserved<br>26 = QPSK (LDPC) 1/2<br>27 = QPSK (LDPC) 2/3 A code<br>28 = QPSK (LDPC) 3/4 A code<br>29 = 16-QAM (LDPC) 1/2<br>30 = 16-QAM (LDPC) 2/3 A code<br>31 = 16-QAM (LDPC) 3/4 A code<br>32 = 64-QAM (LDPC) 1/2<br>33 = 64-QAM (LDPC) 2/3 A code<br>34 = 64-QAM (LDPC) 3/4 A code<br>35 = QPSK (LDPC) 2/3 B code<br>36 = QPSK (LDPC) 3/4 B code<br>37 = 16-QAM (LDPC) 2/3 B code<br>38 = 16-QAM (LDPC) 3/4 B code<br>39 = 64-QAM (LDPC) 2/3 B code<br>40 = 64-QAM (LDPC) 3/4 B code<br>41 . . . 255 = Reserved |
| Normalized C/N for UL ACK region and QPSK 1/3 | 153 | 1 | This is a list of numbers where each number is encoded by one nibble and interpreted as a signed integer The first LS nibble corresponds to the C/N difference of the UL ACK region comparing to the CDMA code in Table 332. The last nibble corresponds to the C/N difference of the QPSK 1/3 comparing to the CDMA code in table 332. |

Using Table 3, the BS maps the FEC code types to 13 DIUCs (i.e., DIUC0-CIUC12) to configure the downlink burst profile. Mapping procedure includes negotiating available coding types by the MS using a Subscriber Station Basic Capability request and response (SBC-REQ/RSP) procedure.

Tables 8 and 9 are examples of modulation and demodulation schemes that can be supported by the MS.

TABLE 8

| Type | Length | Value | Scope |
|------|--------|-------|-------|
| 151 | Variable | Bit #0: 64-QAM<br>Bit #1: BTC<br>Bit #2: CTC<br>Bit #3: STC<br>Bit #4: AAS Diversity<br>Map Scan<br>Bit #5: HARQ<br>Chase<br>Bit #6: HARQ CTC IR<br>Bit #7: HARQ with<br>SPID = 0 only<br>Bit #8: HARQ CC IR<br>Bit #9: LDPC<br>Bit #10–15: Reserved:<br>shall be set to zero. | SBC-REQ (see 6.3.2.3.23)<br>SBC-RSP (see 6.3.2.3.24) |

TABLE 9

| Type | Length | Value | Scope |
|------|--------|-------|-------|
| 152 | Variable | Bit #0: 64-QAM<br>Bit #1: BTC<br>Bit #2: CTC<br>Bit #3: STC<br>Bit #4: AAS Diversity<br>Map Scan<br>Bit #5: HARQ Chase<br>Bit #6: HARQ CTC IR<br>Bit #7: HARQ with<br>SPID = 0 only.<br>Bit #8: HARQ CC IR<br>Bit #9: LDPC<br>Bit #10–15: Reserved:<br>shall be set to zero. | SBC-REQ (see 6.3.2.3.23)<br>SBC-RSP (see 6.3.2.3.24) |
| 153 | 1 | The number of HARQ ACK Channel. | SBC-REQ (see 6.3.2.3.23)<br>SBC-RSP (see 6.3.2.3.24) |

With respect to the FEC code types, there are, to name a few, a Convolutional Code (CC), a Block Turbo Coding (BTC), a Convolutional Turbo Code (CTC), a Zero Tail Convolution Code (ZTTC), and Low Density Parity Code (LDPC). Among these FEC types, CC is considered mandatory while the other types are optional.

In operation, the BS always uses CC since its mandatory. Furthermore, since the DIUC can be mapped to 16 different information, CC is mapped to a maximum of 6 values of DIUC (e.g., DIUC0-DIUC5), and the remaining 6 values are selectively mapped by any one of BTC, CTC, ZTTC, and LDPC.

Even in case of the UIUC, mandatory CC is mapped to a maximum of 6 values (e.g., UIUC0-UIUC5) while the remaining 6 values are selectively mapped by any one of the BTC, CTC, ZTTC, and LDPC.

As an embodiment of the present invention, a method of generating a Burst Profile is introduced, the detail of which are as follows. First, each of the threshold values, represented in a TLV format, is mapped on one-to-one basis to each DIUC/UIUC value. The number of mapped values equals the number of DIUC/UIUC to be configured. Here, the threshold value is based on the FEC code type and the burst profile modification (or change) request. In addition, the burst profile includes information related to the coding type of the burst profile.

Table 10 is an example illustrating a downlink burst profile.

TABLE 10

| Syntax | Size | Notes |
|--------|------|-------|
| Type = 1 | 8 bits | |
| Length | 8 bits | |
| Reserved | 1 bits | Shall be set to zero |
| Coding Type | 3 bits | 000: reserved<br>001: CC<br>010: BTC<br>011: CTC<br>100: ZT CC<br>101: LDPC A<br>110: LDPC B<br>111: reserved |
| DIUC | 4 bits | |
| TLV encoded information | Variable | |

Table 11 is an example illustrating an uplink burst profile.

TABLE 11

| Syntax | Size | Notes |
|--------|------|-------|
| Type = 1 | 8 bits | |
| Length | 8 bits | |
| Reserved | 1 bits | Shall be set to zero |
| Coding Type | 3 bits | 000: reserved<br>001: CC<br>010: BTC<br>011: CTC<br>100: ZT CC<br>101: LDPC A<br>110: LDPC B<br>111: reserved |
| UIUC | 4 bits | |
| TLV encoded information | Variable | |

Figure 2:
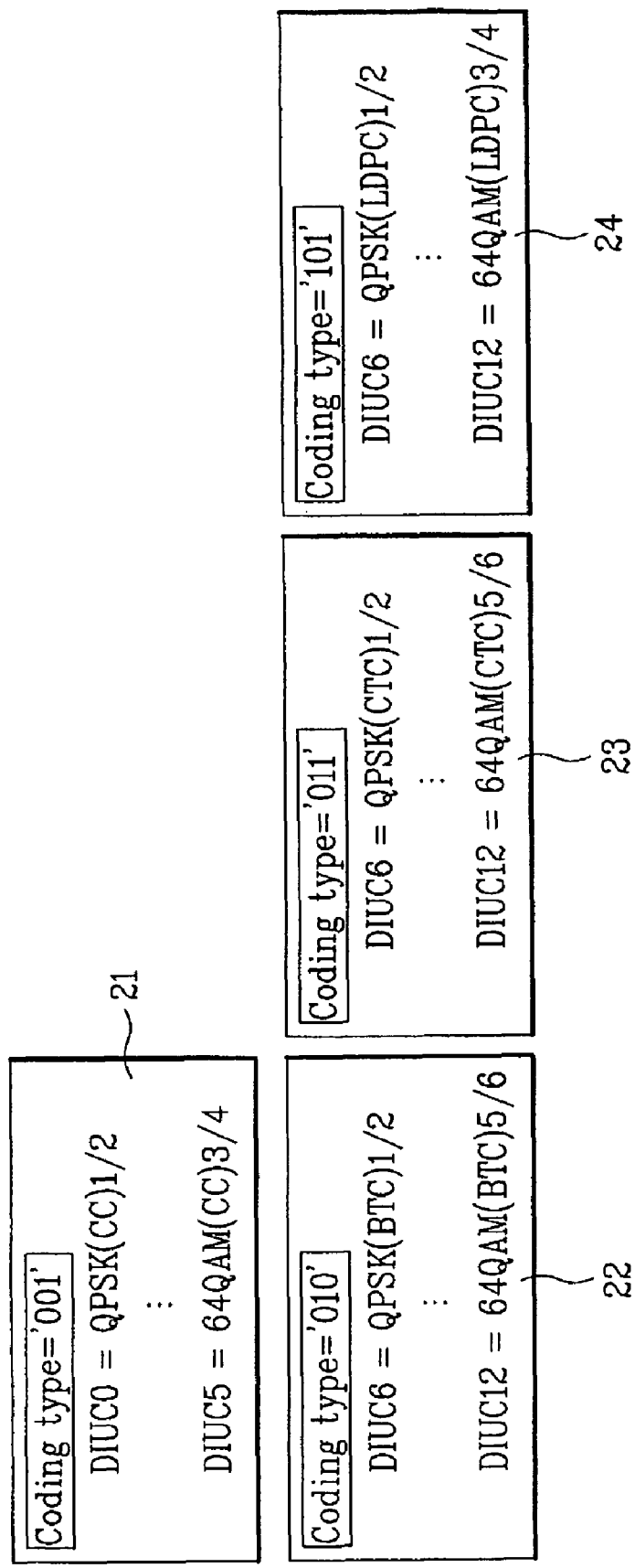
FIG. 2 is an exemplary diagram illustrating mapping of AMC to a DIUC according to a coding type.

FIG. 2 is an exemplary diagram illustrating mapping of AMC to a DIUC according to a coding type. From various available coding types, the BS uses CC as default or put differently, the CC type is always used (i.e., mandatory CC). As such, DIUC for mandatory CC can be referred to as Downlink_Burst_Profile with type=1. As illustrated in FIG. 2, mandatory CC is mapped or allocated to DIUC0-DIUC5 and UIUC0-DIUC6 (21). That is, as shown in Table 10, for example, the 'Coding Type' field can be set as '001,' which represent mandatory CC, and the AMC can be mapped to each of 6 DIUC/UIUCs.

Furthermore, in order to allocate different coding types to remaining DIUCs, the BS allocates different coding types to DIUC6-CIUC12. Here, the coding type(s) allocated to DIUC6-DIUC12 are different from the coding type (i.e., CC) allocated to DIUC0-CIUC5. For example, if the BS decides to use BTC in addition to mandatory CC, the 'Coding Type' field is set to '010', which represent BTC as indicated in Table 10, and the AMC is mapped to DIUC6-CIUC12 (22). Alternatively, if the BS supports CTC or LDPC, the 'Coding Type Set' field can be set to '011' or '101,' respectively, and the AMC is mapped to each set of DIUC6-DIUC12 (23, 24).

Table 12 is another example of a downlink burst profile.

TABLE 12

| Syntax | Size | Notes |
|--------|------|-------|
| Type = 1 | 8 bits | |
| Length | 8 bits | |
| Reserved | 1 bits | Shall be set to zero |

TABLE 12-continued

| Syntax | Size | Notes |
|---|---|---|
| Code type set | 3 bits | 000: reserved |
| | | 001: CC + BTC |
| | | 010: CC + CTC |
| | | 011: CC + ZT CC |
| | | 100: CC + LDPC A |
| | | 101: CC + LDPC B |
| | | 110~111: reserved |
| DIUC | 4 bits | |
| TLV encoded information | Variable | |

Table 13 is another example of an uplink burst profile.

TABLE 13

| Syntax | Size | Notes |
|---|---|---|
| Type = 1 | 8 bits | |
| Length | 8 bits | |
| Reserved | 1 bits | Shall be set to zero |
| Code type set | 3 bits | 000: reserved |
| | | 001: CC + BTC |
| | | 010: CC + CTC |
| | | 011: CC + ZT CC |
| | | 100: CC + LDPC A |
| | | 101: CC + LDPC B |
| | | 110~111: reserved |
| UIUC | 4 bits | |
| TLV encoded information | Variable | |

Figure 3:
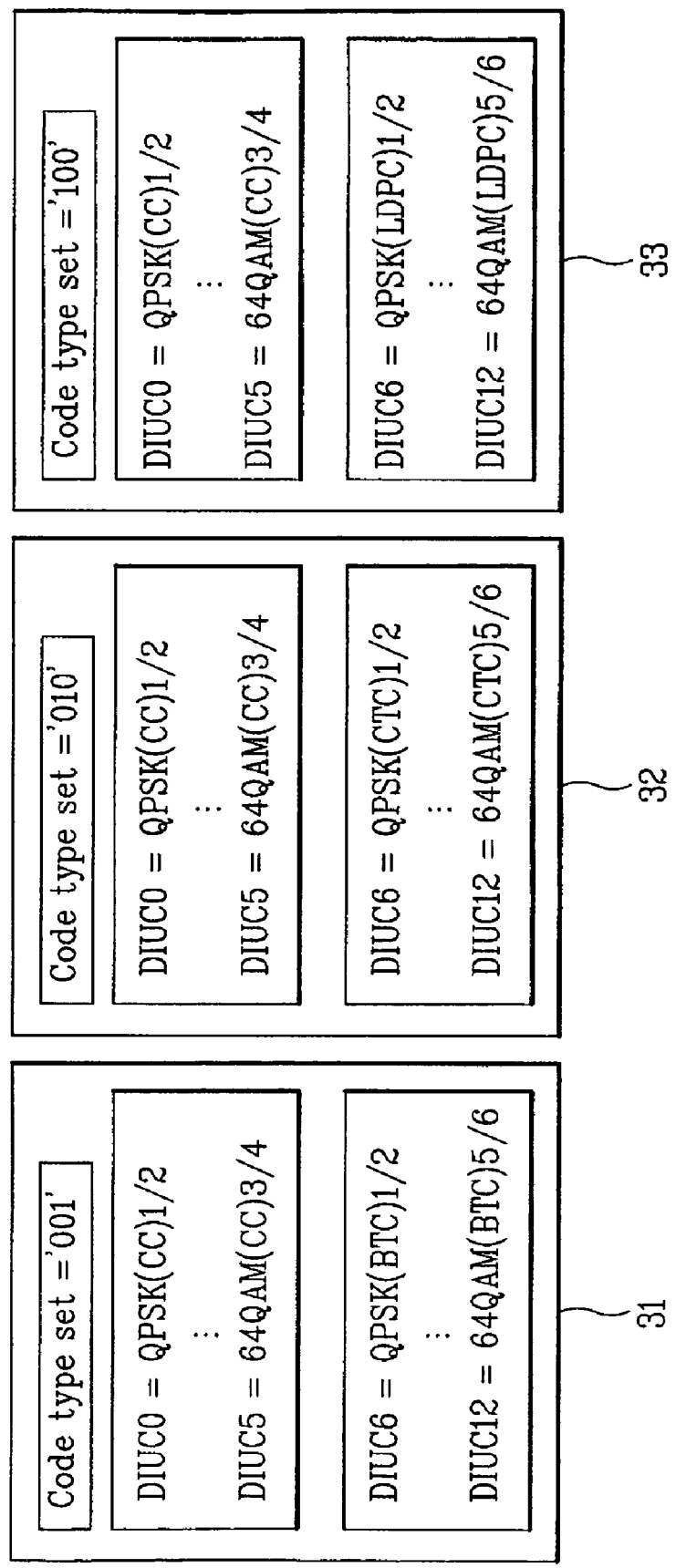
FIG. 3 is an exemplary diagram illustrating mapping of the AMC to DIUC according to a coding type.

FIG. 3 is an exemplary diagram illustrating mapping of the AMC to DIUC according to a coding type. As illustrated in FIG. 3, a combination of each coding type can be used to configure a burst profile. Of many coding types, the BS allocates the mandatory CC. As such, the BS configures a 'Code Type Set' field according to coding types additionally supported by the BS. For example, if the BS supports BTC in addition to, of course, mandatory CC, the 'Code Type Set' field is set to '001.' Under this setting, mandatory CC is allocated to DIUC0-DIUC5 and UIUC1-DIUC6 while BTC is allocated to DIUC6-DIUC12 (31).

Alternatively, if the BS supports CTC in addition to mandatory CC, the 'Code Type Set' field is set to '010,' the mandatory CC is allocated to DIUC0-DIUC5 and UIUC1-DIUC6 while CTC is allocated to DIUC6-DIUC12 (32).

Alternatively, if the BS supports LDPC in addition to mandatory CC, the 'Code Type Set' field is set to '100,' the mandatory CC is allocated to DIUC0-DIUC5 and UIUC1-DIUC6 while LDPC is allocated to DIUC6-DIUC12 (33).

Figure 4:
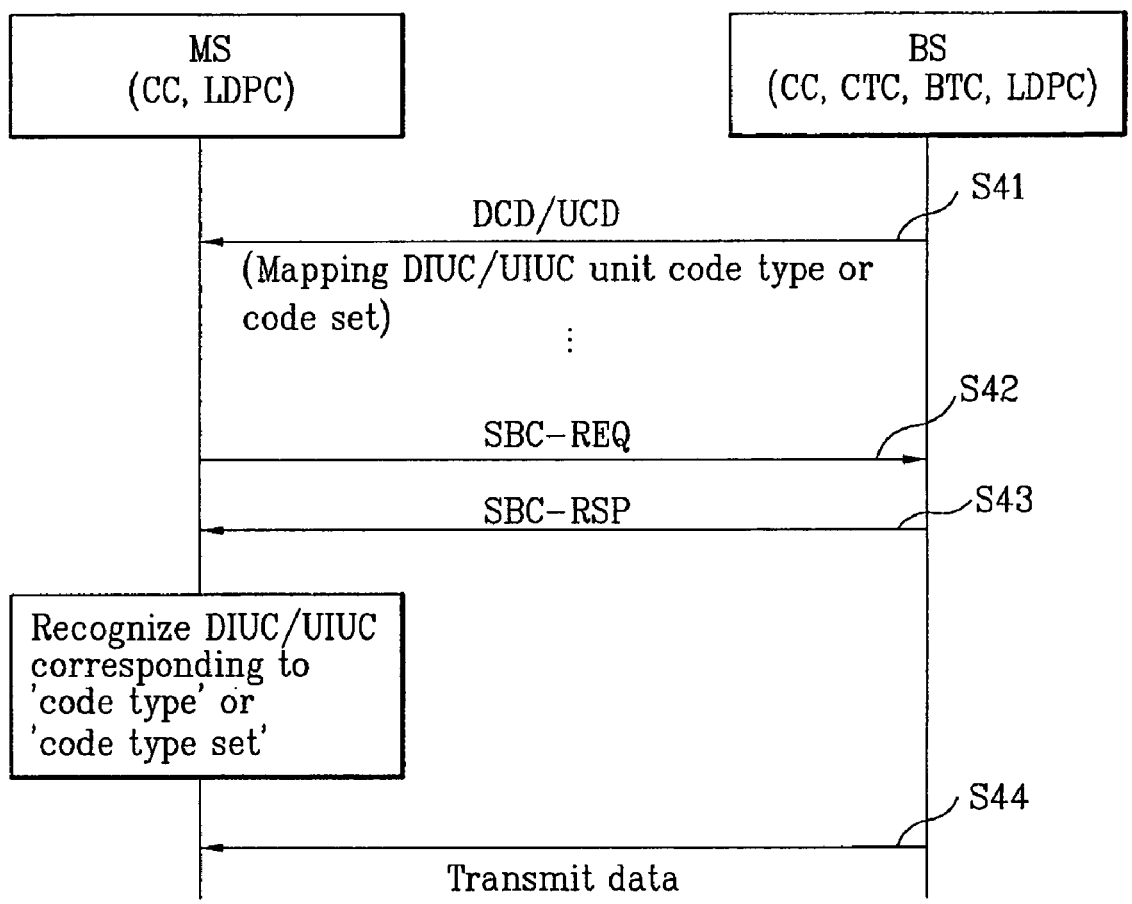
FIG. 4 illustrates an example of a method of applying burst profile.

FIG. 4 illustrates an example of a method of applying burst profile. As illustrated in FIG. 4, the MS receives the burst profile, generated based on each coding types, via the DCD/UCD message (S41). Thereafter, the MS and the BS use the SBC-REQ/RSP process to negotiate the coding types that can be respectively supported (S42, S43). After receiving the SBC-RSP message from the BS, the MS interprets the DIUC value which corresponds to the 'Coding Type' or the 'Code Type Set' that can be supported by the MS.

After receiving the Burst Profile via the DCD/UCD message and negotiating with the BS the coding types that can be supported, if the coding type is determined (e.g., LDPC type), then the AMC, representing CC and LDPC types, is applied to the specific burst allocated to the MS, and the MS receives the downlink signal based on the AMC (S44).

Alternatively, it is possible to use the IE of the DL-MAP/UL-MAP to provide the MS, currently using a specific coding type, with a new coding type. When a new coding type is added via the expanded DIUC/UIUC, a new FEC code type can be provided to all MSs via the expanded DIUC.

Figure 5:
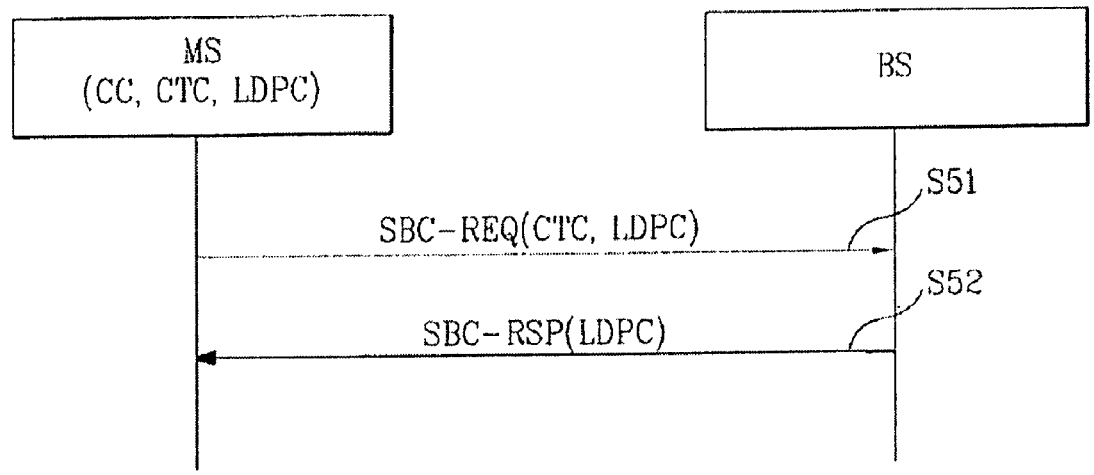
FIG. 5 illustrates an example of a method of applying another burst profile.

FIG. 5 illustrates an example of a method of applying another burst profile. As illustrated in FIG. 5, the MS supports one default coding type and two newly added enhanced coding types. The MS uses the SBC-REQ message to report the coding types that can be supported by the MS (S51). In response, the BS uses the SBC-RSP message to notify the MS of which newly added enhanced coding types the BS intends to support (S52). In order to apply DIUC/UIUC, the MS recognizes the DIUC/UIUC values of the burst profile included in the DCD transmitted by the BS with the coding type allocated by the BS.

As illustrated in FIG. 5, the MS uses at least one of CC, CTC, and LDPC coding types. For example, if the MS uses mandatory CC and at the same time, CTC and LDPC can be supported, the MS reports the availability of these two coding types (e.g., CTC or LDPC) to the BS via the SBC-REQ message. Upon receipt, the BS selects one of the two coding types (i.e., LDPC) and transmits the selection via the SBC-RSP message to the MS. Thereafter, the MS recognizes the DIUC/UIUC values according to the LDPC.

Furthermore, a 'Type' field included in the DCD/UCD can be used to distinguish types of information necessary for the MS. For example, as illustrated in Tables 3 and 4, the 'Type' field is set to '1.' Conventionally, the 'Type' field is used to determine the burst profile. As described above, the burst profile includes using at least one coding type, including a default coding type, while configuring the 'Type' field to '1.' Moreover, the burst profile using a new coding type can be used to notify of a new coding type.

Table 14 is another example illustrating a downlink burst profile. Here, Table 14 defines the format of the Downlink_Burst_Profile with Type=153, which is used in the DCD message for the MS only. The DIUC field is associated with the Downlink_Burst_Profile and Thresholds. The DIUC value is used in the DL-MAP message to specify the burst profile to be used for a specific downlink burst.

TABLE 14

| Syntax | Size | Notes |
|---|---|---|
| Downlink burst profile{ | | |
| Type = 153 | 8 bits | |
| Length | 8 bits | |
| Reserved | 2 bits | Shall be set to zero |
| Coding Type | 2 bits | 00: BTC |
| | | 01: CTC |
| | | 10: ZT CC |
| | | 11: LDPC |
| DIUC | 4 bits | |
| TLV encoded information | Variable | |
| } | | |

Similarly to when the 'Type' field is set to '1,' here, the 'Type' field is set to '153' in the burst profile. The MS uses the burst profile having the 'Type' field set to '1' to learn (or receive information) of the AMC level mapping of at least one coding type (i.e., CC). If the MS receives the burst profile having the 'Type' set to '153,' the MS can only select the coding type(s) retained by the MS.

Table 15 is another example of an uplink burst profile.

TABLE 15

| Syntax | Size | Notes |
|---|---|---|
| Uplink burst profile{ | | |
| Type = 13 | 8 bits | |
| Length | 8 bits | |
| Reserved | 2 bits | Shall be set to zero |
| Coding Type | 2 bits | 00: BTC |
| | | 01: CTC |
| | | 10: ZT CC |
| | | 11: LDPC |
| UIUC | 4 bits | |
| TLV encoded information | Variable | |
| } | | |

Table 16 is an example illustrating the values of a UCD.

TABLE 16

| Name | Type (1 byte) | Length (1 byte) | Value (variable-length) | PHY scope |
|---|---|---|---|---|
| ... | ... | ... | ... | ... |
| Bandwidth_request_backoffb_start | 11 | 1 | Initial backoff window size for contention BW requests, expressed as a power of 2. Values of n range 0–15 (the highest order bits shall be unused and set to 0 | OFDMA |
| Bandwidth_request_backofff_start | 12 | 1 | Final backoff window size for contention BW requests, expressed as a power of 2. Values of n range 0–15 (the highest order bits shall be unused and set to | OFDMA |
| Uplink_burst_profile | 13 | 1 | May appear more than once (see 6.3.2.3.3 and 8.4.5.5). The length is the number of bytes in the overall object, including embedded TLV items. | OFDMA |

Table 17 is an example illustrating the values included in a DCD.

TABLE 17

| Name | Type (1 byte) | Length (1 byte) | Value (variable-length) | PHY scope |
|---|---|---|---|---|
| ... | ... | ... | ... | ... |
| Time-to-Trigger duration | 52 | 1 | Time-to-Trigger duration is the time duration for MS decides to select a neighbor BS as a possible target BS. It is the unit of ms and applicable only for HHO. | OFDMA |
| MAC version | 148 | 1 | See 11.1.3 | OFDMA |
| Downlink_burst_profile | 153 | 1 | May appear more than once (see 6.3.2.3.1 and 8.4.5.5). The length is the number of bytes in the overall object, including embedded TLV items. | OFDMA |

As illustrated in Tables 16 and 17, the value of the 'Type' field included in the DCD or UCD can be interpreted. Moreover, when the value of the 'Type' field is defined, besides the Burst Profile indicating the value of the 'Type' field is set to 'I,' the DCD/UCD can be used to indicating the existence of a new Burst Profile.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of supporting multiple code types in a wireless mobile communication system, the method comprising:

receiving by a mobile station (MS) a downlink channel descriptor (DCD) from a base station (BS), wherein the DCD includes at least one downlink burst profile comprising a type of the at least one downlink burst profile, a downlink interval usage code (DIUC) and type/length/value (TLV) encoded information, wherein a value of the type of the at least one downlink burst profile determines whether a code type is included in the at least one downlink burst profile; and recognizing, by the MS, the code type if the code type is included in the at least one downlink burst profile, wherein the code type indicates a coding scheme to be used by the BS to code a downlink burst associated with the at least one downlink burst profile, wherein the coding scheme is at least one of Block Turbo Code (BTC), Convolutional Turbo Code (CTC), Zero Tail Convolution Code (ZTTC), and Low Density Parity Code (LDPC), wherein when the value of the type of the at least one downlink burst profile is set to 1, the at least one downlink burst profile does not include the code type and the downlink burst associated with the at least one downlink burst profile is encoded by a convolutional code, wherein when the value of the type of the at least one downlink burst profile is set to 153, the at least one downlink burst profile includes the code type for indicating the coding scheme and the downlink burst is encoded by the coding scheme indicated by the code type, wherein the DIUC for the convolutional code is referred to the at least one downlink burst profile with the value of type set to 1.

2. The method of claim 1, wherein the TLV encoded information comprises a Forward Error Correction (FEC) code type, a DIUC Mandatory exit threshold and a DIUC Minimum entry threshold.

3. The method of claim 1, wherein when the type of the at least one downlink burst profile is set to a value of 153, the code type of the at least one downlink burst profile supports code types from multiple code classifications.

4. The method of claim 1, when the value of the type of the at least one downlink burst profile is set to 153, the at least one downlink burst profile is used in the DCD for the MS only.

5. The method of claim 1, when the value of the type of the at least one downlink burst profile is set to 153, only coding schemes retained by the MS are selected by the MS.

6. A mobile station for a wireless mobile communication system supporting multiple code types, the mobile station comprising:

a receiver receiving a downlink channel descriptor (DCD) from a base station (BS), wherein the DCD includes at least one downlink burst profile comprising a type of the at least one downlink burst profile, a downlink interval usage code (DIUC) and type/length/value (TLV) encoded information, wherein a value of the type of the at least one downlink burst profile determines whether a code type is included in the at least one downlink burst profile; and a processor recognizing the code type if the code type is included in the at least one downlink burst profile, wherein the code type indicates a coding scheme to be used by the BS to code a downlink burst associated with the at least one downlink burst profile, wherein the coding scheme is at least one of Block Turbo Code (BTC), Convolutional Turbo Code (CTC), Zero Tail Convolution Code (ZTTC), and Low Density Parity Code (LDPC), wherein when the value of the type of the at least one downlink burst profile is set to 1, the at least one downlink burst profile does not include the code type and the downlink burst associated with the at least one downlink burst profile is encoded by a convolutional code, wherein when the value of the type of the at least one downlink burst profile is set to 153, the at least one downlink burst profile includes the code type for indicating the coding scheme and the downlink burst is encoded by the coding scheme indicated by the code type, wherein the DIUC for the convolutional code is referred to the at least one downlink burst profile with the value of type set to 1.

7. The mobile station of claim 6, wherein the TLV encoded information comprises a Forward Error Correction (FEC) code type, a DIUC Mandatory exit threshold and a DIUC Minimum entry threshold.

8. The mobile station of claim 6, wherein when the type of the at least one downlink burst profile is set to a value of 153, the code type of the at least one downlink burst profile supports code types from multiple code classifications.

9. The mobile station of claim 6, when the value of the type of the at least one downlink burst profile is set to 153, the at least one downlink burst profile is used in the DCD for the mobile station only.

10. The mobile station of claim 6, when the value of the type of the at least one downlink burst profile is set to 153, only coding schemes retained by the mobile station are selected by the mobile station.

* * * * *